United States Patent [19]
Bailey

[11] Patent Number: 6,071,031
[45] Date of Patent: Jun. 6, 2000

[54] MOVABLE MECHANICAL STRUCTURES

[75] Inventor: Ralph Peter Steven Bailey, Chanctonbury, United Kingdom

[73] Assignee: Hexel Corporation, Portsmouth, N.H.

[21] Appl. No.: 08/849,987

[22] PCT Filed: Dec. 5, 1995

[86] PCT No.: PCT/GB95/02841

§ 371 Date: Aug. 12, 1997

§ 102(e) Date: Aug. 12, 1997

[87] PCT Pub. No.: WO96/18045

PCT Pub. Date: Jun. 13, 1996

[30]    Foreign Application Priority Data

Dec. 5, 1994 [GB] United Kingdom .................... 9424514
Dec. 5, 1994 [GB] United Kingdom .................... 9424515
Dec. 5, 1994 [GB] United Kingdom .................... 9424517

[51] Int. Cl.[7] ......................................................... F16D 3/00
[52] U.S. Cl. ............................ 403/57; 403/115; 403/122; 901/28
[58] Field of Search ..................................... 403/164, 115, 403/114, 57, 74, 122, 143, 141, 135, 142; 74/471; 248/288.31, 288.51; 901/28, 29

[56]    References Cited

U.S. PATENT DOCUMENTS

| 3,072,426 | 1/1963 | Gilbert | 403/115 |
|---|---|---|---|
| 4,324,501 | 4/1982 | Herbenar | 403/115 X |
| 4,499,784 | 2/1985 | Shum | 74/490.06 |
| 4,928,546 | 5/1990 | Walters | 403/122 |
| 5,568,993 | 10/1996 | Potzick | 403/90 |

FOREIGN PATENT DOCUMENTS

| 583008 | 1/1995 | France . | |
| 3718533 | 6/1987 | Germany . | |
| 393090 | 6/1933 | United Kingdom . | |
| 938256 | 10/1963 | United Kingdom | 403/135 |

*Primary Examiner*—Lynne Reichard
*Assistant Examiner*—David E. Bochna
*Attorney, Agent, or Firm*—Hopgood, Calimafde, Kalil & Judlowe

[57]    ABSTRACT

Several improvements relating to hexapods are described. The improvements relate to universal joints and ball and socket joints where two struts meet at a common focal point, two axis gimbals which are used for ballscrew drives in universal joints and a micro positioning device incorporating a hexapod structure. The universal joint (1) includes two part spheres (13, 14) connected to one strut (12) and a rotatable ring (15) connected to another strut (11). The two part spheres (13, 14) are secured together by fasteners (25) with the ring (15) secured therebetween so as to form a sphere. The ring (15) is preloaded and rotatable about a common axis (17) of the sphere.

15 Claims, 5 Drawing Sheets

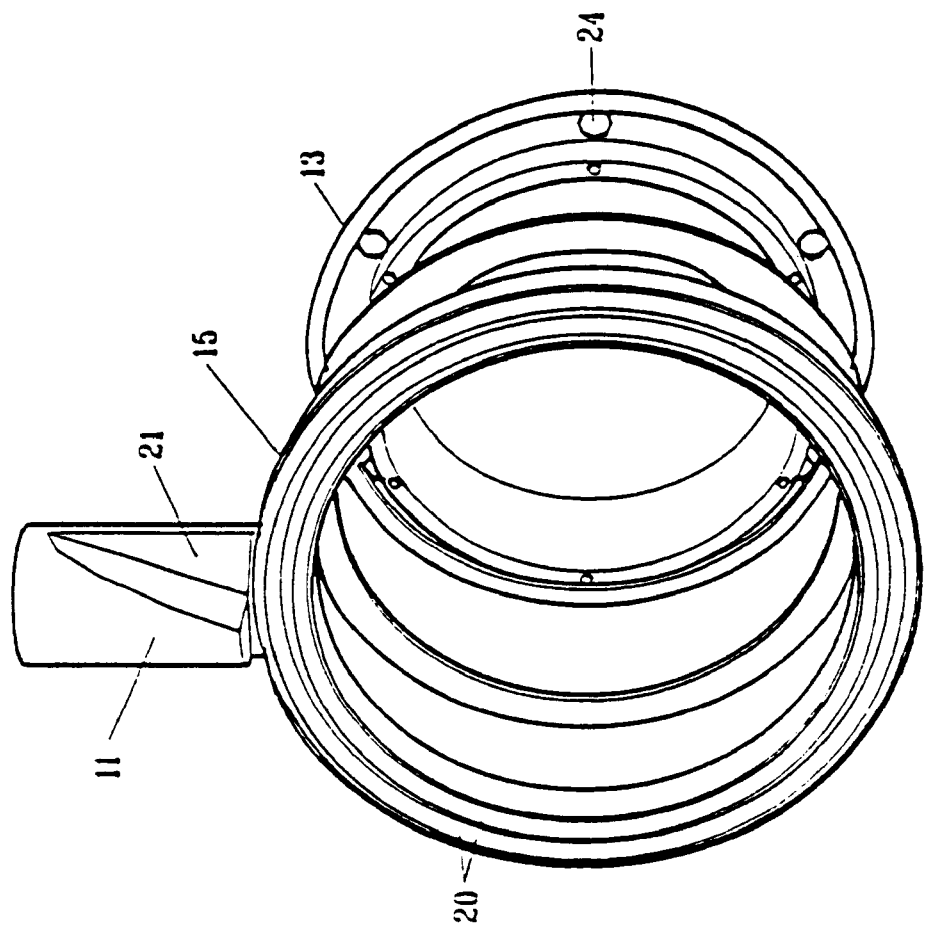
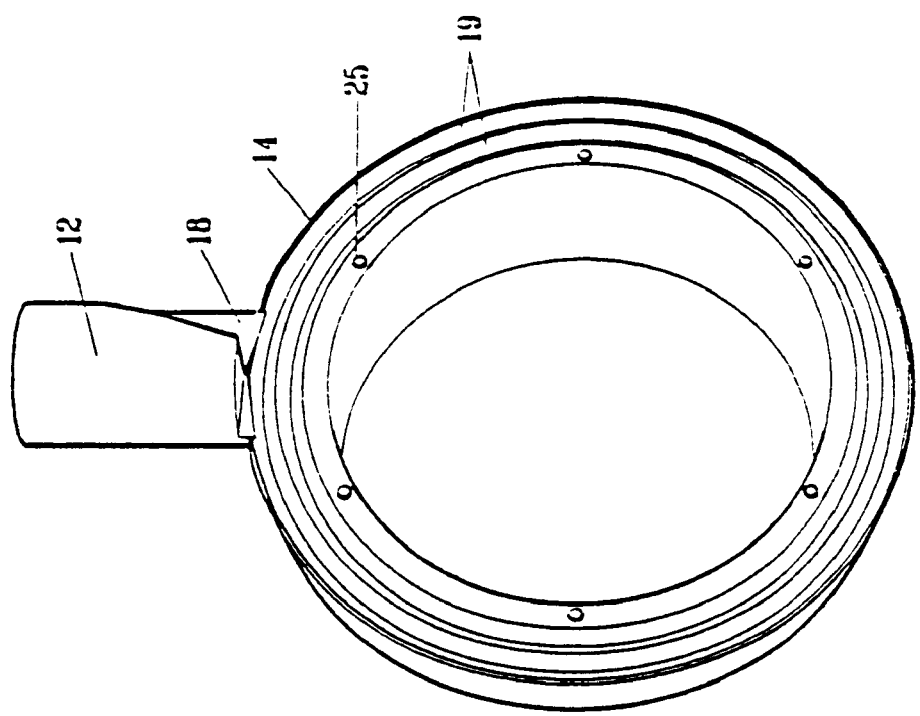
Fig. 2

MOVABLE MECHANICAL STRUCTURES

FIELD OF THE INVENTION

This invention concerns improvements relating to movable mechanical structures particularly though not exclusively to parallel strut structures such as hexapods or Stuart platforms. More specifically, the invention concerns universal joints and ball and socket joints where two struts meet at a common focal point, two axis gimbals which are used for ballscrew drives in universal joints and a micro positioning device incorporating a hexapod structure.

BACKGROUND OF THE INVENTION

In known machine tool design, it has been necessary to devise joints incorporating a mechanism able to constrain the relative rotation between two struts whilst permitting them to pivot on a common axis, thus allowing the couplet to be free to articulate in all axes. These types of joints are necessary for building parallel strut structures, such as hexapods.

Methods have been proposed where the universal freedom about a pivot point is enabled in the form of a ball and socket joint; where each strut is connected to a hemisphere together defining the ball of said joint. However, these previous solutions to this problem have proved difficult to build accurately because of the requirement to assemble an accurate sphere out of two hemispheres. It is much easier to build a single surfaced sphere which can be ground and/or lapped to achieve the degree of sphericity required.

Modern machine design such as hexapod based machine tools may require universal joints capable of a very wide degree of freedom.

A ball and socket joint is conceptually a good solution because it can be made to high precision and is easy to calibrate because it accurately maintains its pivot origin. The disadvantage of a conventional solution is the limited degree of freedom that can be supported because of the necessity of holding the ball over a large angle to minimise holding pressures and hence friction.

One solution that has been proposed is to retain the ball magnetically in the bottom half of the socket only, thereby leaving more than a hemisphere of articulation space. While being suitable for some applications, the joint would become unduly massive to achieve the very high holding forces necessary in some cases such as for large scale machining.

In the design of hexapods, it has been necessary to provide a mechanism well suited to drive a screw shaft through a focal point notionally within a two axis universal joint.

To build a ballscrew drive point in a universal joint it is necessary to constrain its motion to two degrees of freedom so that it can resist the torque of rotating the ballnut. This can currently be achieved either by a standard two axis gimbal with orthogonally opposed axes or by a suitably constrained ball and socket joint. Both of these methods have disadvantages.

In the case of the standard gimbal, because preload needs to be applied to each end stop, any thermal or load stresses will move the pivot point about both orthogonal axes. This makes the node point unreliable.

In the case of the constrained ball and socket joint, when confronting large loads, stiffness can only be achieved at the cost of friction in the ball to socket interface; and/or extending the socket over more of the ball thereby limiting the articulation.

There is a need for a mechanism able to translate a load through six degrees of freedom at extreme resolution. On many occasions it is desirable to alter the position and alignment of instrument components by very small degrees. Presently this is accomplished by multi-axis stages arranged in a series chain of polar and Cartesian single axis stages. It is difficult to keep such an arrangement stiff without unduly increasing the size and weight of the structure and reducing its freedom of available movement.

SUMMARY AND OBJECTS OF THE INVENTION

It is an object of the invention to overcome or substantially reduce at least some of the above described problems associated with movable mechanical structures.

According to a first aspect of the present invention there is provided a universal joint for connecting together two struts, said universal joint comprising two part spheres connectable to one strut and a rotatable ring connectable to the other strut, said two part spheres being secured together with said ring secured therebetween to form a sphere and said ring being rotatable about a common axis of said sphere.

According to a second aspect of the present invention there is provided a combination of a universal joint and two struts, said universal joint comprising two part spheres secured together and a rotatable ring secured therebetween to form a sphere, one of said struts being connected to said part spheres and the other being connected to said ring, such that both of said struts can pivot relative to each other about a common axis of said sphere.

According to a third aspect of the present invention there is provided a ball and socket joint for pivotally connecting together two struts at a common focal point, said ball and socket comprising a ball held in a two part socket, said two part socket comprising a reference portion having a hemispherical inner surface for engaging the ball and a retaining portion for retaining the ball in the socket, the retaining portion being slidable on said reference portion and having means for engaging the ball.

According to a fourth aspect of the present invention there is provided a two axis gimbal having a single axis preload force applied to complementary annular surface formations provided about a single axis thereof.

According to a fifth aspect of the present invention there is provided a two axis gimbal comprising primary means for rotating a strut connected thereto in a first axis and secondary means for rotating the primary means coupled thereto in a second axis orthogonal to said first axis, wherein the secondary means includes preloading means for preloading said gimbal in said second axis and said preloading means includes a frictional interface of complementary surface formations.

According to a sixth aspect of the present invention there is provided a micro positioning device comprising a base, a platform, and a plurality of elongate struts each connected at its respective ends to said vase and said platform, said plurality of struts being arranged to provide six degrees of freedom of movement between said base and said platform, wherein said each of said struts comprise Magnetostrictive, electrostrictive or piezoelectric material and are linearly extensible by the application of an electromagnetic field thereto.

The above and further features of the invention are set forth with particularity in the appended claims and together with the advantages thereof, will become clear to those skilled in the art from consideration of the following detailed description of several exemplary embodiments of the invention given with reference to the accompanying drawings.

BRIEF DESCRIPTION OF THE DRAWINGS

FIG. 2 is a schematic perspective view of the respective parts of the universal joint shown in FIG. 1;

DETAILED DESCRIPTION OF THE EMBODIMENTS

Each of the following embodiments is described separately hereinafter but it is to be appreciated that they are all related to movable mechanical structures by being parts of a hexapod structure.

UNIVERSAL JOINT

Figure 1:
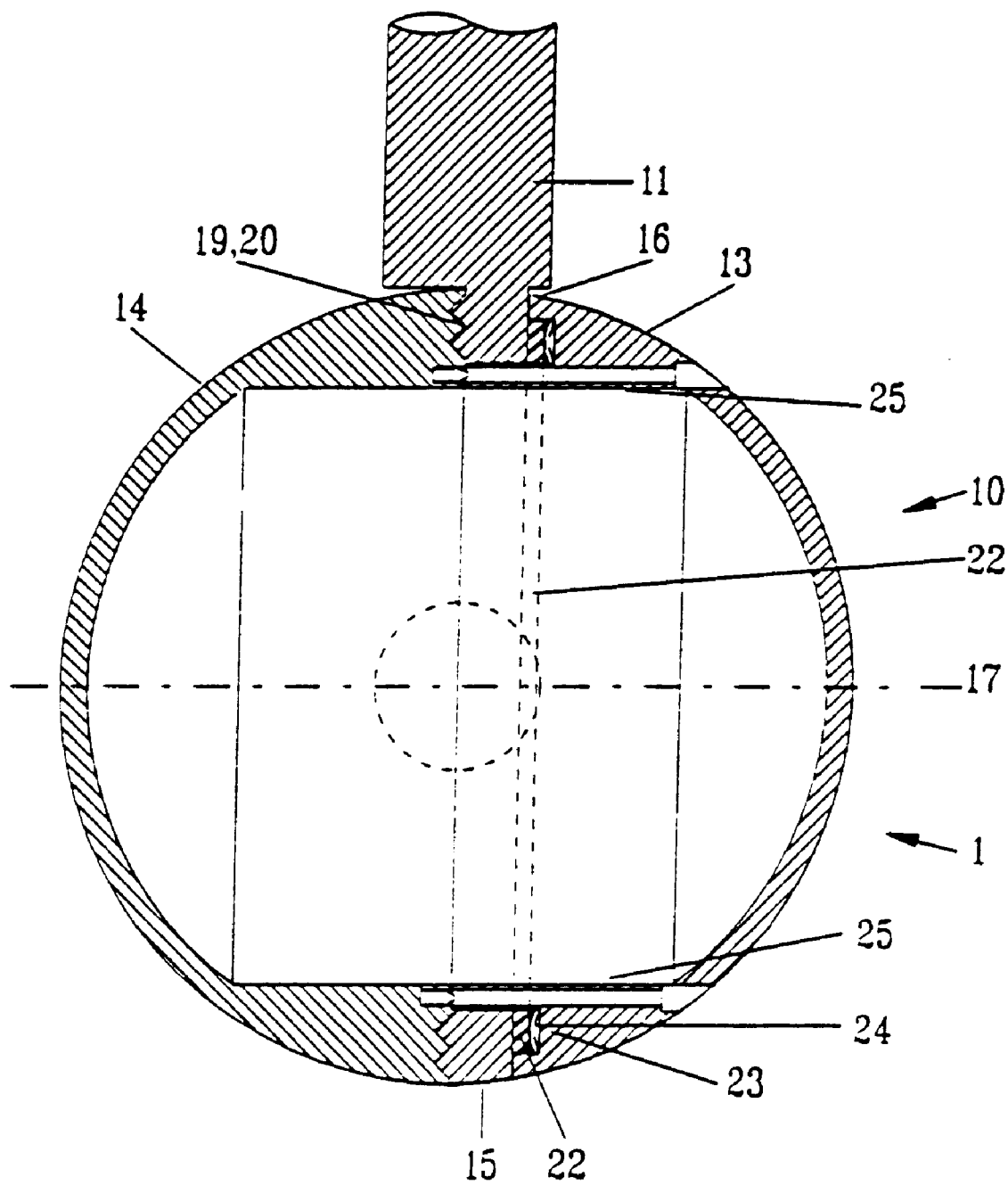
FIG. 1 is a schematic cross sectional view of a universal joint embodying a first and second aspects of the present invention.

Referring now to FIGS. 1 and 2 there is shown a universal joint 1 including a ball joint sphere 10 connected to first and second struts 11, 12. The ball joint sphere 10 is assembled out of two parts 13, 14 and prepared to a high accuracy. One of the parts 14 is connected to the second strut 12 whilst the first strut 11 is connected to a ring 15 which is retained in a circumferential channel 16 formed about a rotational axis 17 of the sphere 10.

The universal joint 1 is assembled by the sphere 10 being opened and the ring 15 being introduced into the channel 16. The sphere is then reassembled to recreate the sphericity with the second strut 11 able to rotate about the sphere's axis 17.

The sphere 10 and strut 12 are manufactured by turning an appropriate workpiece in the axis of the second strut 12. The resultant sphere 10 and strut 12 are then turned again, but in an orthogonal axis 17 to create the shell shown in FIG. 2 (left). The second strut 12 is cut away at 18 like a pair of scissors to merit a tight closure angle between both struts 11, 12 when the universal joint is assembled. A bearing surface 19 of one of the parts 14 is an annular groove designed to mate with a conforming counter surface 20 of the ring 15. Alternatively it could be raceway to retain balls or rollers. The key design objective is that it can support axial loads effected by the preload when assembled and radial loads caused by compression or tension forces in the strut.

The first strut 11 is similarly cut away at 21 to enable closure. The ring 15 features the other bearing surface 20, such that when preloaded together with the sphere 10, it is able to rotate about the sphere's axis 17. When the sphere 10 is closed, a further annular pressure plate 22 is configured to act against the ring 15, pressing it together with its mating bearing surface 19 by springs 23 or other loading device located in pockets 24. The act of closing the sphere 10 introduces this preload.

The two parts 13, 14 of the sphere 10 are located by kinematic means such as a Kelvin Clamp such as the type disclosed in FIGS. 27(a) and 27(b) of U.S. Pat. No. 5,575,597, to ensure repeatable positioning after opening to introduce the strut/ring. A set (in this embodiment 6) of fasteners 25 are used to bolt the two parts together.

The inventive concept underlying this embodiment involves the majority of the sphere's surface being connected to one of the two struts. The parts 13, 14 of the sphere are hollowed out and this advantageously enables the mass of the universal joint 1 to be minimised.

BALL AND SOCKET JOINT

Figure 3:
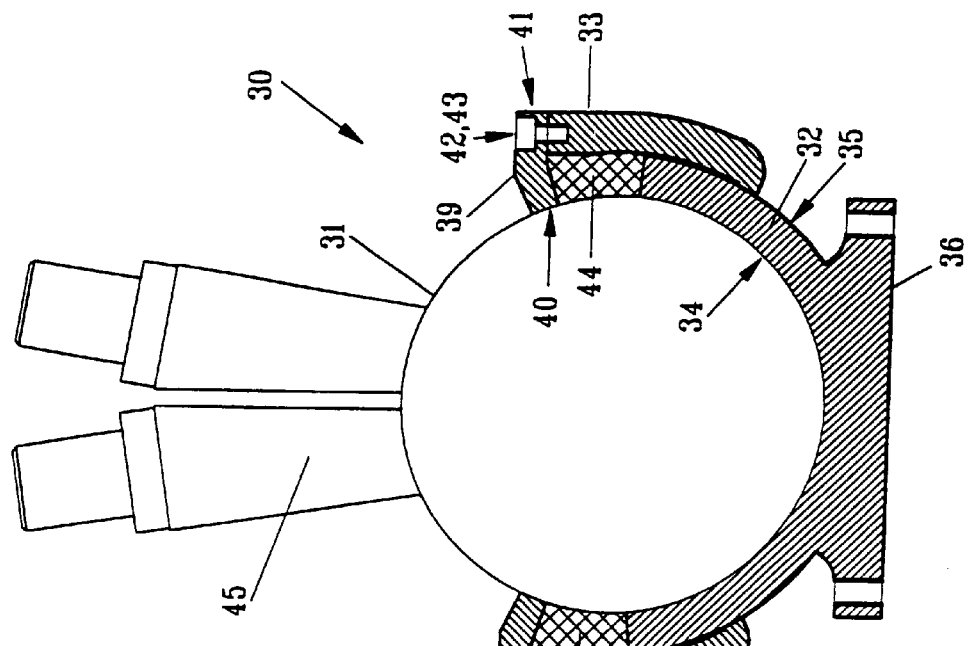
FIG. 3 is a schematic sectional view of a ball and socket joint embodying a third aspect of the present invention at a maximal angular position.
Figure 4:
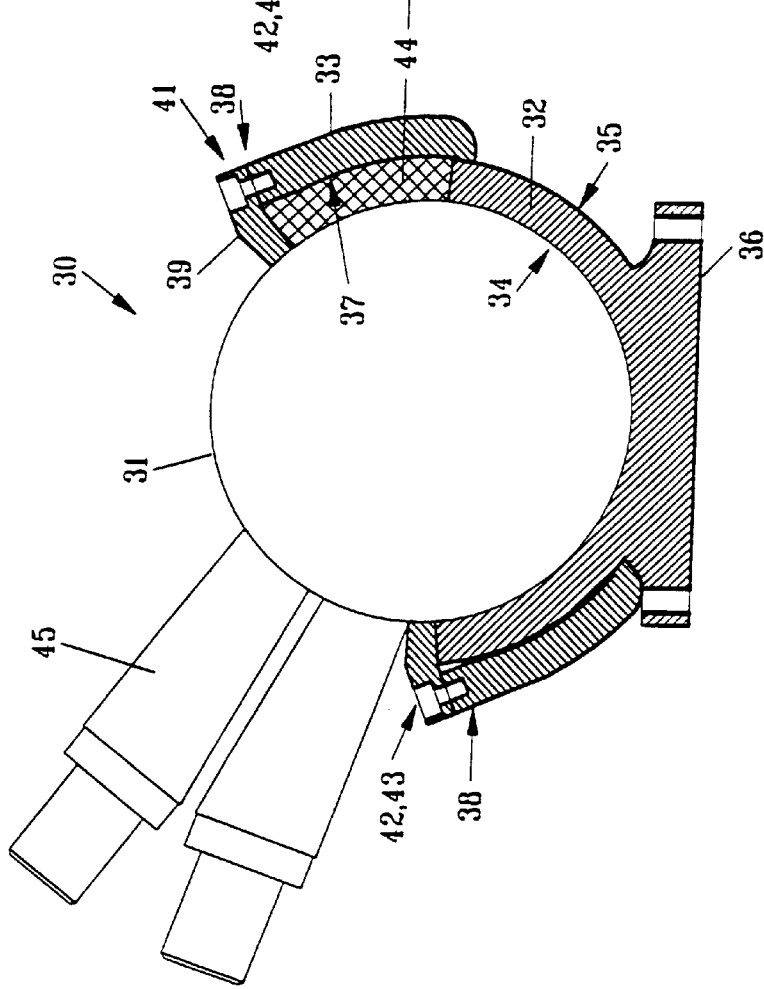
FIG. 4 is a schematic sectional view of a ball and socket joint of FIG. 3 at a minimal angular position.

Referring now to FIGS. 3 and 4, there is shown a ball and socket joint embodying the third aspect of the present invention. The ball and socket joint 30 comprises a ball 31 a reference socket 32 and a movable partial socket 33. The ball 31 of this embodiment preferably comprises the universal joint 1 described hereinbefore with reference to FIGS. 1 and 2. The reference socket 32 comprises hemispherical shell is prepared with a precision internal surface 34, and a reasonably good annular external surface 35, extending down to a mounting flange 36.

The partial socket 33 is prepared such that it has a low friction contact ring 37 conforming to the sphericity of the external surface 35 of the reference socket 32. The partial socket 33 is modified into a cylindrical profile at it supper end 38, such that is necessary to allow it to pass over the lip of the reference socket 32 during installation.

An annular pressure ring 39 is prepared such that it has an internal profile 40 confirming to the retained ball 31, and a flange 41 extending to overlap with the partial socket 33.

The ball and socket joint 30 is assembled by retaining the pressure ring 39 against the partial socket 33 with a radial array of fasteners 42, each acting through a stack of disc springs 43. The compression established in these springs 43 during assembly creates the ball retaining preload. The pressure ring 39 is allowed to effectively 'float' on its springs 43 so as not to fight with the tracking accuracy established by the reference socket 32.

The internal space or cavity 44 between the socket parts and ball maintains a constant volume during joint articulation and is beneficially filled with a lubricant. This lubricant could be a shear viscous lubricant such as Kilopoise. Lubricant leakage could be minimised with sliding annular seals acting between ball and pressure ring and/or partial socket and external reference socket. A lubricant pressure feed could be established into this cavity to maintain constant lubricant film thickness.

The reference socket and pressure ring contact surfaces 34, 40 can be made by replicating the profile of a precision gauge ball with a resin composite such as Moglise. In this way a very high precision device can be made at low cost.

The external reference socket surface 35 and contacting ring 37 of the partial socket 33 need not be prepared to such high precision. Inaccuracies can be compensated for by the array of disc springs 43 causing the holding preload against the pressure ring 39, which references itself against the ball.

In this embodiment, the ball is retained in a precise positional reference socket by an annular pressure ring. This is preloaded to trap the ball by tensioning it against a further partial socket shell trapped by the outer surface of the reference socket shell.

In use, to achieve maximum angular movement, the strut(s) 45 first comes up against the lip of the socket, and the displaces this further as the partial socket slides around the reference socket. At all times the pressure ring maintains its holding force pushing the ball into the reference socket.

The effective total socket angle can be less than 180 degrees being the total of the included angle of the reference socket plus the two contact angles of the pressure ring. A further advantage of this embodiment is that extended articulation of the struts 45 is permitted without the use of magnetic forces.

TWO AXIS GIMBAL

Figure 5:
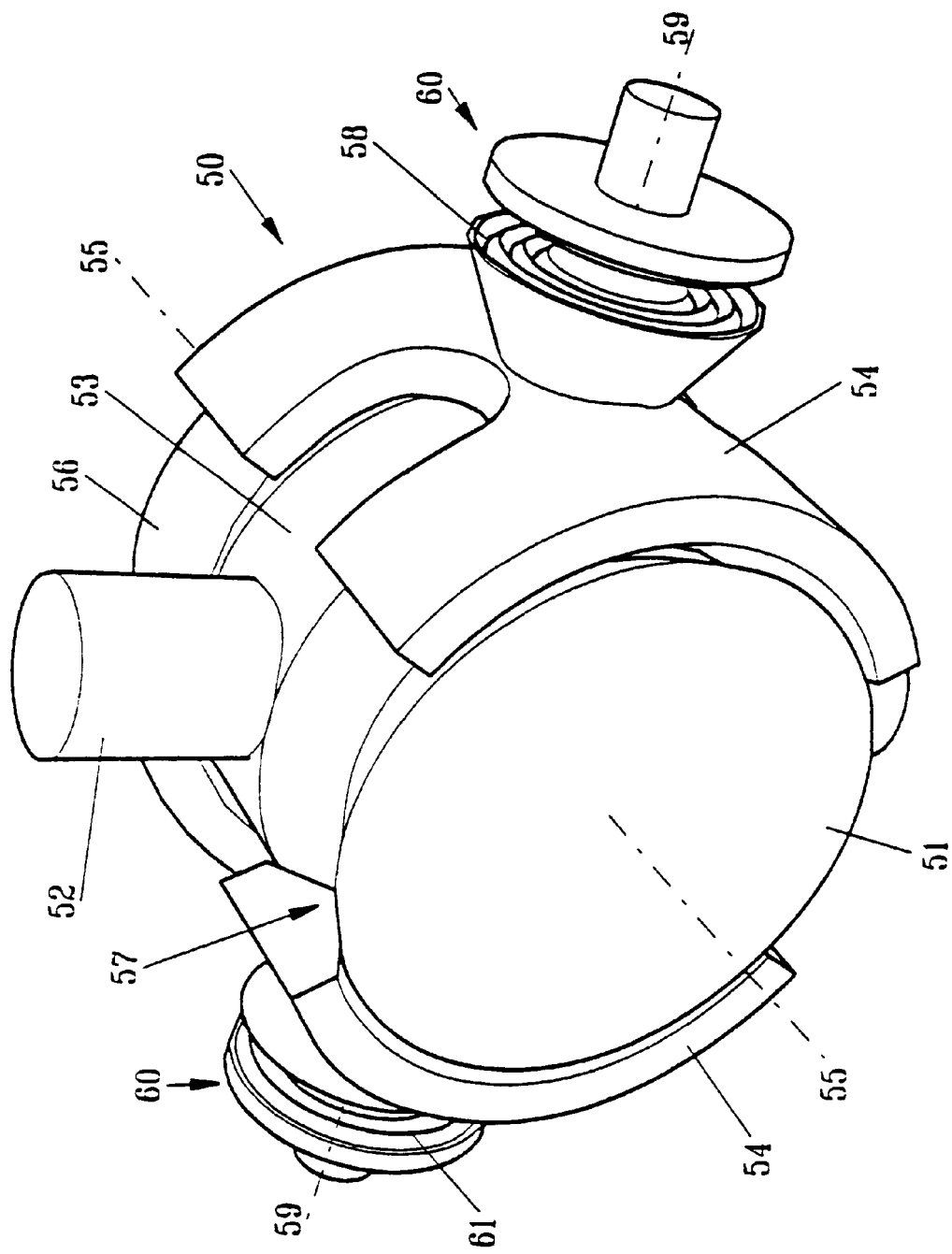
FIG. 5 is a schematic perspective view of a two axis gimbal embodying fourth and fifth aspects of the present invention.

Referring now to FIG. 5, there is shown a two axis gimbal embodying the fourth and fifth aspects of the present invention. The two axis gimbal 50 comprises a barrel 51 having a drive strut 52 extending from a side surface 53 thereof. The barrel 51 is constrained within two clamping structures 54 which act to hold the barrel 51 and to restrict its movement to rotation about a local axis 55, hereinafter referred to as the secondary axis.

The barrel 51 has two circumferential grooves 56 extended around its side surface 53. Complementary ridge formations 57 provided on inner surfaces of said clamping structures 54, engage with the grooves 56 to constrain the barrel movement to rotation about the secondary axis 55.

Each of the clamping structures 54 is provided with a series of concentric continuous annular grooves 58 which are provided about a fixed axis 59 hereinafter referred to as the primary axis. Respective clamping heads 60, also provided along the primary axis 59, have complementary concentric continuous annular ridges or tapers 61 which are arranged to engage the grooves 58 of the clamping structures 54. In this way, rotation of the clamping structures 54 is possible with respect to the primary axis 59.

The tapers 61 of the clamping heads 60 and the grooves 58 of the clamping structures 54 enable a single axis preload to be applied along the primary axis 59 which provides support for the gimbal against both radial and axial forces.

The primary axis 59 needs to sustain large radial force as a result of the tension or compression in the drive strut 52 (shown in FIG. 5 protruding vertically). Axial forces are largely as a result of the preload applied across the barrel 51 or when the secondary axis 55 is rotated.

The secondary axis 55 needs to sustain large radial forces. If the drive strut 52 acts in tension or compression only, then axial forces are minimal. The groove design can reflect this with shallower features. In fact, many alternative groove or taper designs are possible, the principle being to support both axial and radial forces.

The frictional interfaces (grooves 56, 58 and tapers 57, 61) can be coated with a bonded lubricant such as Molycote, a proprietary compound containing Molybdenum. The large contact area promotes damping especially when the interface is additionally coated with a suitable silicon lubricant such as a Fluorosilicon.

There are three areas of improvement which this embodiment has over conventional gimbals:

Both axes are supported from adjacent points, thereby avoiding bending moments in the usual gimbal rocker frame.

Friction pads are used in preference to bearings to enable higher preloads and to damp out vibrations.

Thermal expansion acts along one axis only; thereby holding a more predictable centre in all operating conditions.

There are three areas of improvement which this embodiment has over a conventional constrained ball and socket joint:

The proposed joint can hold the ball over a greater angle than a socket can, without incurring any loss of articulation.

Movement is confined to slip-ways which are more readily sealed than a complete socket.

It is easier to grind a precision groove than achieve high precision sphericity in a large ball.

In an alternative embodiment, instead of using plain bearings, ball or roller bearings can be employed in the case of the primary axis, these can be of conventional radial design. For the secondary axis, because of the need to apply preload between both sides of the bearing, the bearing would beneficially be split into two semicircular halves with an elastomeric coupling between said halves to enable the movement of balls or rollers from one half to the other. Alternatively each half could be kept discrete with the balls or rollers forced to recirculate through an internal return path (in a similar manner to a recirculating ball track or nut).

MICRO POSITIONING DEVICE

Figure 6:
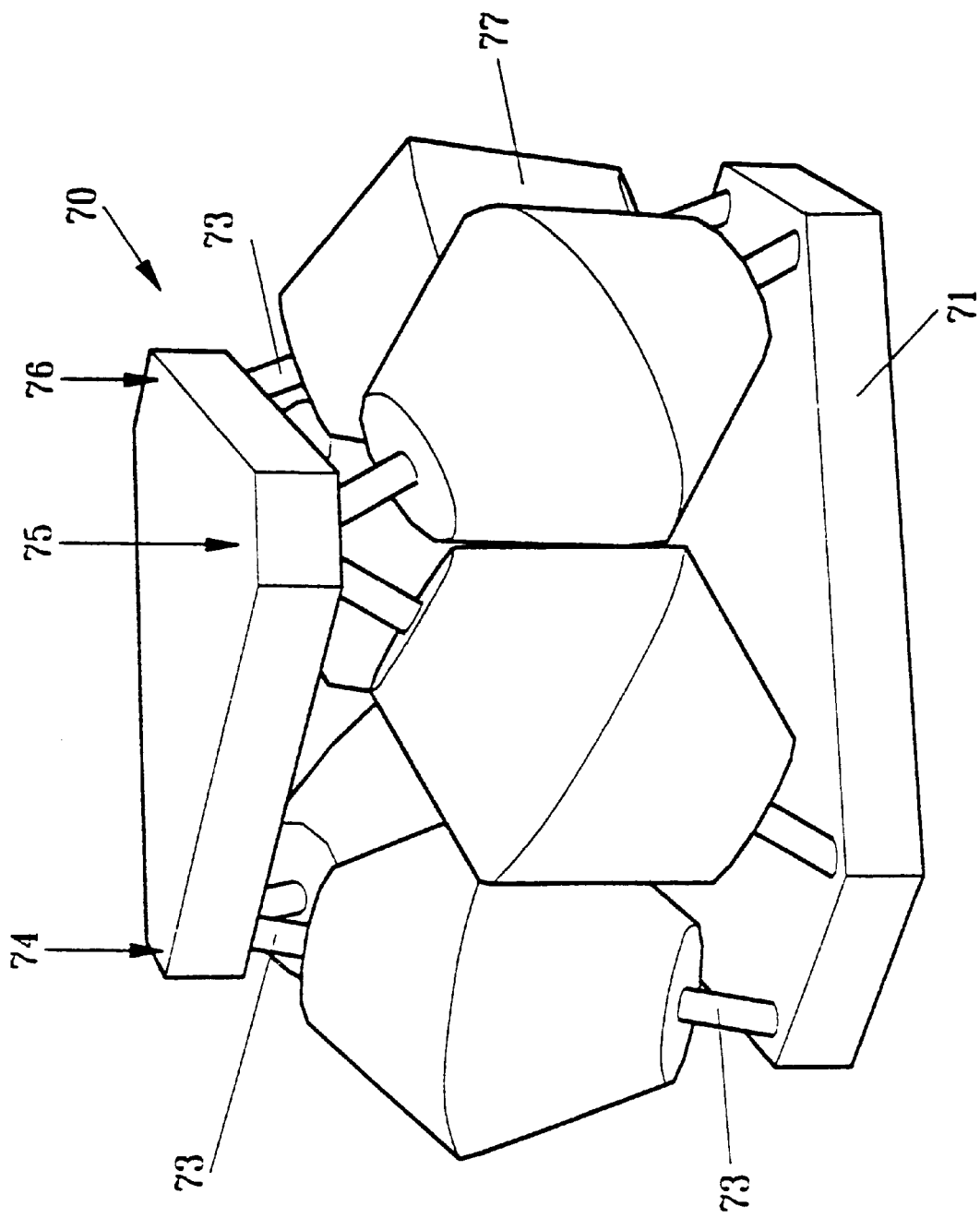
FIG. 6 is a schematic perspective view of a micro positioning device embodying a sixth aspect of the present invention.

Referring to FIG. 6 there is shown a 6 axis micro positioning device 70 embodying a sixth aspect of the invention. The micro positioning device comprises a base 71 and a platform 72 mounted on the base 71 by 6 supportive legs 73. The effective length and angular orientation of the legs 73 is controllably adjustable to effect movement of the platform 72.

The supportive legs 73 are arranged in 3 pairs and are coupled to the platform at triangularly spaced apart locations 74, 75, 76. The legs 73 extend from these locations 74, 75, 76 in divergent directions and are attached to the base 71 at spaced apart locations.

Each leg 73 comprises a magnetostrictive material, though electrostrictive and piezoelectric materials are also suitable. The extension of each leg 73 is caused by the application of a magnetic field along its length and electric coils 77 are provided around each strut for generating the respective magnetic fields.

In general terms, this embodiment integrates the desired movement into a parallel strut mechanism often referred to as a Stuart Platform or hexapod, using struts 73 comprised of magnetostrictive electrostrictive or piezoelectric materials. Devices of this type are of use to laser optics, integrated circuit wafer preparation, tunnelling microscopy nano-mechanics etc.

Magnetostrictive materials have been developed which exhibit relatively large expansions; such as Turfenol available from Johnson Matthey, which can expand by about 0.15%. The extent of the expansion can be controlled very smoothly by using the electrified coil 77 around each strut 73 to generate a variable magnetic field.

By controlling the current to say 16 bits (1 in 65.5k) struts of 40 mm length can be usefully stepped through length increments of 10 nanometers (0.01 micron) over a useful range of 0.06 mm. Higher resolutions can be obtained by shortening the effective strut or employing piezo based systems. Both options are however at the expense of useful range.

These increments would gear up by virtue of the hexapods geometry, but would alternatively be error averaged such that a small error in an individual strut length will equate to an even smaller error in the platform.

The struts could be connected between the base and platform by various means depending on loading and translation requirements.

If only the smallest platform movements are required, the struts can be bonded between base and platform. The arrangement then relies on strut flex to accommodate the changes in geometry. Because of the resultant complex virtual pivot points, the structure needs to be calibrated to achieve good absolute accuracy. Other sorts of flexural or elastomeric base and platform joints can be applied to reduce strut flexing.

For larger translations, or where volumetric accuracy is at a premium, spherical universal joints can be employed. A magnetic socket can be used to retain the spherical end to the strut, resting unambiguously on three kinematic pads. By explicitly measuring the spherical surfaces as they seat in their kinematic sockets, the pivot points can be established. These geometry nodes are used to determine accurate platform translations. When platform positions are compared against an absolute reference, the good initial calibration makes it much easier for subsequent error correction software to converge.

If heavy platform loads or high accelerations are envisaged, sockets comprising mounting pads to both seat the ball and retain it can be produced. To be unambiguously constrained they would have three low friction kinematic pads arranged such that their normals intersect at a common point consistent with the radius of the sphere to be retained. These pads could consist of polymeric bearing material or Zirconium or other low friction ceramic material. A preloaded thrust ring consisting of at least three more bearing surfaces is then retained around the strut protruding from the sphere acting against the sphere in such a way as to retain it in its socket.

As an alternative to holding the sphere between kinematic pads, a larger conforming spherical concavity can be retained, and repeatable positioning of the enclosed sphere obtained by surface error averaging with a suitable non Newtonian lubricant (or one otherwise sealed to prevent it being squeezed out). Other options exhibiting good averaging include air or hydrostatic bearings.

Methods to measure the strut length explicitly in order to close a control loop could be employed. In one embodiment LVDT's are used. These could act through a hollow core in the struts with a suitably dimensionally stable push rod and mounting. Alternatively they could act like a cylinder enclosing the magnetostrictive drive coils.

Other solutions are possible depending on resolution required including optical interferometric means.

The control system for such a device consists of processor able to translate from Cartesian space to hexapod strut lengths. It employs a calibrated correction table which equates a given current to the coil to a strut extension. This also includes thermal correction based on the measured temperature of the strut. It could alternatively be based on close loop control if suitable absolute strut length or other position transducers are fitted. High level software enables Cartesian and polar incrementing, 6 axis path following and pattern scanning to be achieved.

It is noted that if the node geometry is such that adjacent strut pairs form parallelograms (with their base separation the same as the platform separation) and the struts forming the parallelograms are controlled in synchronous to common lengths, then the platform will be constrained to three (X, Y, Z, ) degrees of freedom only.

Thus having described all the aspects of the invention by reference to specific embodiments, it is to be well appreciated that the invention is not limited to the above described embodiments but that modifications and variations are possible without departure from the spirit and scope of the invention as determined by the appended claims.

I claim:

1. A universal joint connecting together two struts, said universal joint comprising two part spheres connected to one strut and a rotatable ring connected to the other strut, said two part spheres being secured together with said ring secured therebetween to form a sphere and said ring being rotatable about a common axis of said sphere, preload means for pressing said ring against one of said part spheres to provide preloading of said ring, wherein said preload means comprises an annular pressure plate and a plurality of loading devices, each of said plurality of loading devices being located in a pocket of the other of said part spheres.

2. A universal joint according to claim 1 wherein said ring and one of said part spheres each comprise a complementary bearing surface permitting rotation therebetween.

3. A universal joint according to claim 1 wherein said complementary bearing surfaces comprise annular groove and ridge formations.

4. A universal joint according to claim 1 wherein the two part spheres are secured together by a plurality of fasteners extending therebetween.

5. A universal joint according to claim 1 wherein each of the part spheres is hollow.

6. A universal joint as claimed in claim 1, wherein the preload devices each comprise a spring.

7. A universal joint according to claim 1 wherein said struts further comprise complementary cut portions which allow a relatively small closure angle to be attained between the struts.

8. A universal joint according to claim 1 wherein a ball constituted by said two part spheres and said ring is held in a two part socket, said two part socket comprising a reference portion having a hemispherical inner surface for engaging the ball and a retaining portion for retaining the ball in the socket, the retaining portion being slidable on said reference portion and having means for engaging the ball.

9. A ball and socket joint according to claim 8 wherein an internal space between the reference portion, the retaining portion and the ball is filled with lubricant to provide a liquid bearing.

10. A universal joint according to claim 9 wherein said lubricant comprises a shear viscous lubricant.

11. A universal joint according to claim 8 wherein said reference portion includes a mounting flange having mounting formations therein.

12. A universal joint according to claim 8 wherein said reference portion has a part spherical outer surface and said retaining portion has a complementary part spherical inner surface for engaging the outer surface of the reference portion.

13. A universal joint according to claim 8 wherein said engaging means comprises an annular flange having a ball engaging surface conforming to the curvature of the internal surface of the reference portion.

14. A universal joint according to claim 13 wherein said annular flange is mounted to said retaining portion by a plurality of fastener means so as to generate a ball retaining preload.

15. A universal joint according to claim 13 wherein the ball engaging surfaces of said reference portion and said annular flange comprise a resin composite material.

* * * * *